Jan. 28, 1969 P. A. KANE 3,424,396
RELEASABLE TAPE-REEL SECURING MEANS
Filed May 8, 1967 Sheet 1 of 3
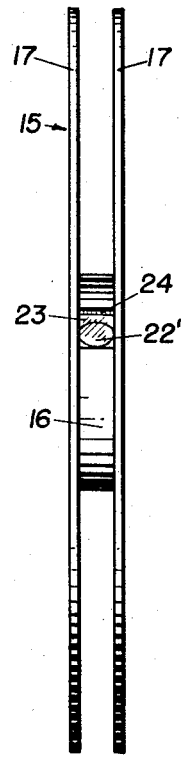
FIG. 1
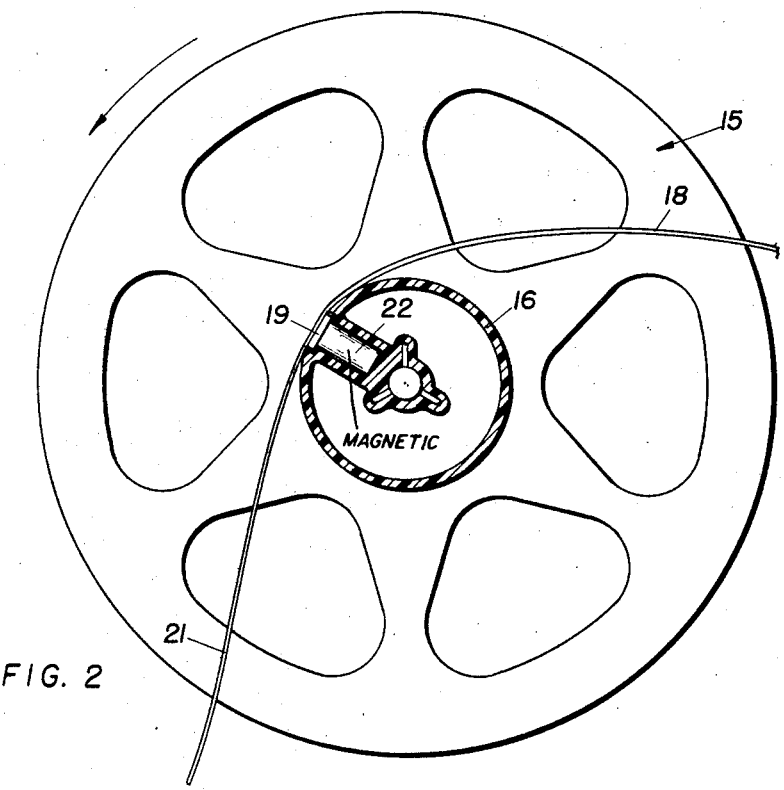
FIG. 2
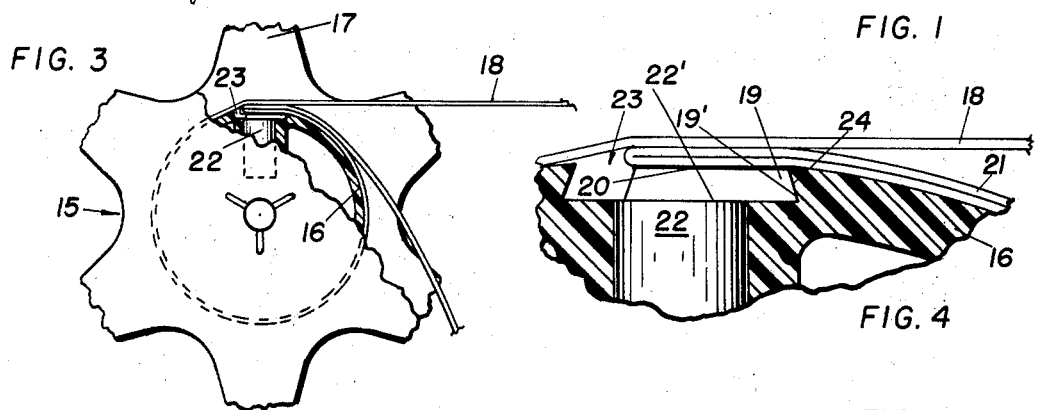
FIG. 3
FIG. 4
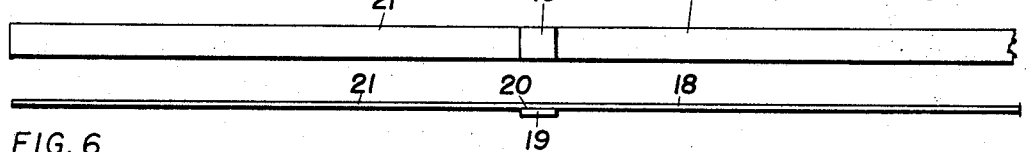
FIG. 5
FIG. 6
INVENTOR
Patrick A. Kane
BY Patrick A. Kane
INVENTOR.

Jan. 28, 1969 P. A. KANE 3,424,396
RELEASABLE TAPE-REEL SECURING MEANS
Filed May 8, 1967
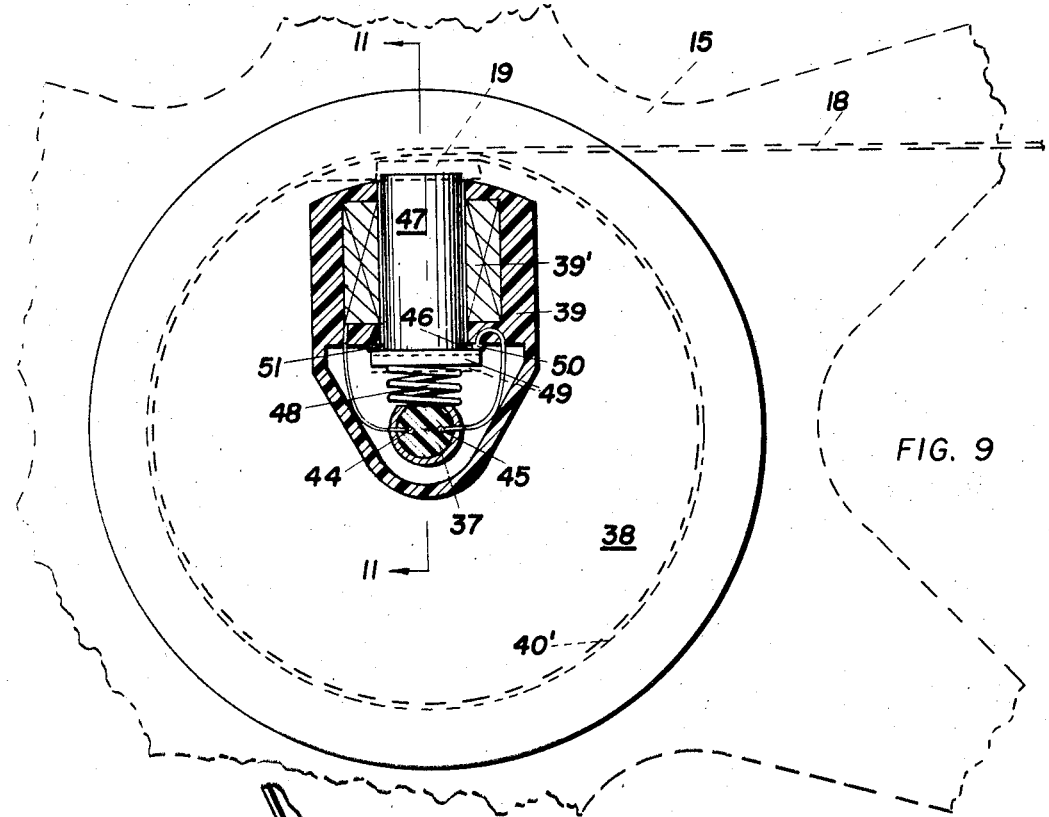
FIG. 9
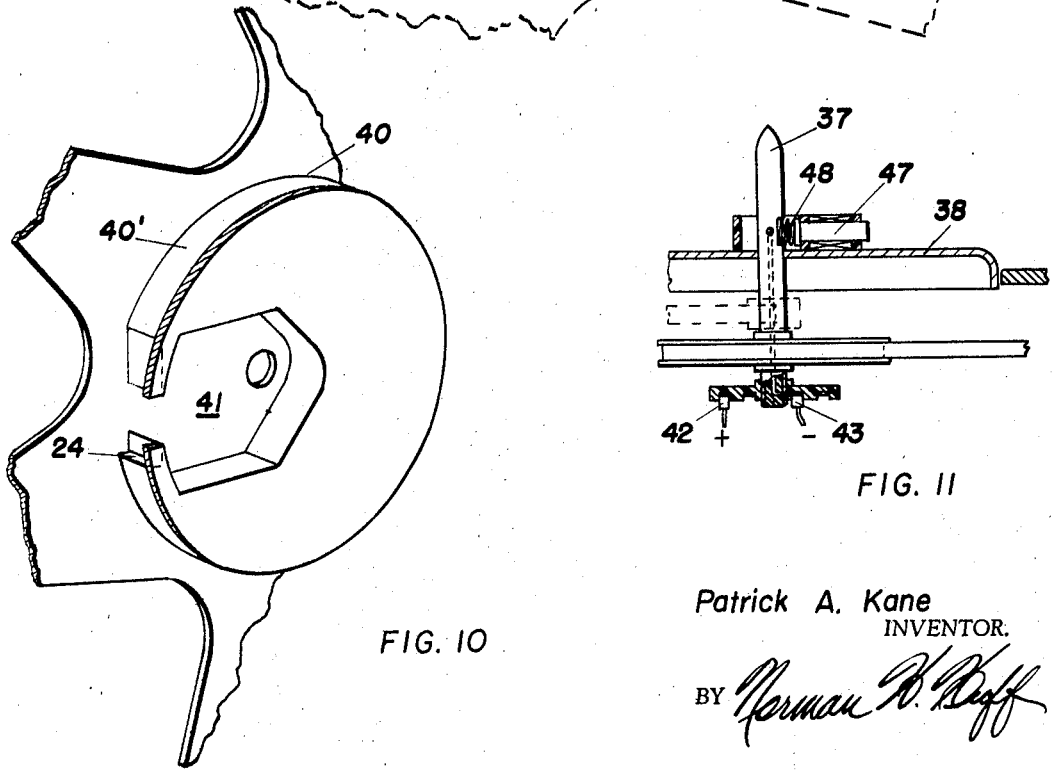
FIG. 10
FIG. 11
Patrick A. Kane
INVENTOR.
BY Norman B. Beff United States Patent Office 3,424,396
Patented Jan. 28, 1969

3,424,396
RELEASABLE TAPE-REEL SECURING MEANS
Patrick A. Kane, Hartline, Wash. 99135
Filed May 8, 1967, Ser. No. 636,907
U.S. Cl. 242—74                                9 Claims
Int. Cl. B65h 75/28

ABSTRACT OF THE DISCLOSURE

The invention consists in a tape having a rigid magnetic substance attached to a selected point spaced from the end of the tape and shaped to present a hook edge to cooperate with a hook-shoulder formed in a reel hub. A magnetic substance is located in the reel relative to said shoulder and one or both of said substances are magnetized to yieldably hold them in hooked engagement against centrifugal force and gravity as the reel rotates.

---

This invention relates to means for releasably securing a flexible tape-like member to a specially constructed reel or spool, as for example in the applications of magnetic tape, motion picture film, typewriter ribbons and such like to their respective reels or spools.

The difficulty encountered by most people in attaching tape-like members to their reels is often quite disconcerting since frequently after performing the required threading function conventionally required, the member pulls from the reel when pressure is applied by rotating the reel, thus requiring repetition of this task which, while not necessarily difficult, is at least disagreeable.

The principal object of my present invention is to provide improved means whereby a tape-like member is releasably and easily secured to its cooperating reel or spool and initially held in said relationship by means of magnetism.

Another object of this invention lies in the provision of a mechanical catch or attachment which is effective to interconnect the tape and its reel when the force is a tension between the reel and the tape, substantially on a tangent with respect to the hub of a reel; but, releasable as the direction of the tension approaches a radii thereof; and said interconnection being yieldably biased by magnetism.

Yet another object of my present invention lies in the provision of cooperating magnetic substances fixed relative to the tape and the reel at least one of which is at least momentarily magnetized to attract the other.

A further object of this invention is to provide the hub of a reel of the character described with an electro-magnet which includes a switch in its circuitry for de-energizing the magnet after its function of facilitating the attachment of a tape has been accomplished.

A still further object of the present invention lies in the provision of means, actuable by a tape winding upon the hub of a reel, for actuating said switch to de-energize said magnet.

It is yet another object of this invention to provide the hub of a reel with a compartment adapted to receive a magnet which rotates therewith but is fixed to rotate with the spindle upon which the reel is removably placed and thus one that comprehends the foregoing objects in a device which is relatively inexpensive to manufacture but very desirable operationally.

With respect to the tape-like member, it is an object of this invention to affix its magnetic substance at a point along the tape, spaced from a free end thereof a distance at least substantially equal to the radius of a reel to which it is to be attached so that by grasping the tape at the free end and a point spaced therefrom at least equal to the diameter of said reel, the tape may be moved laterally into the reel to position the paramagnetic substance of the tape on the annular face of the reel hub where magnetic attraction between the paramagnetic substances associated with the reel hub and the tape may be effective; it being understood that at least one of said substances is to be magnetized.

Throughout this document, I employ the term "magnetic" and its analogues to mean a capability of being attracted by magnetism though the substance may not be, for the time being, actually magnetized. For example, the core of an electromagnet is included in the term "magnetic substance" though it is not magnetized at the time.

The foregoing and other objects and advantages of the present invention will become more apparent and meaningful during the course of the following specification when considered in association with the accompanying drawings wherein a preferred form of the invention and a number of modified forms are graphically illustrated. It is to be understood however, that the drawings are illustrative only and are not intended to limit the scope of the invention. It should also be understood that various changes in construction may be resorted to in the course of manufacture without in any way departing from the spirit of the invention, which is to be understood only in accordance with the appended claims. Furthermore, it should be understood that while the invention is described in one particular field of utility, it is not my intention to so limit the applicability of the invention but I desire to reserve to myself the claimed invention for every use of which it is now known to be or subsequently discovered to be susceptible.

Other advantages and features of this invention will become apparent from the more detailed description following in which like reference numerals are employed to designate similar parts in the accompanying drawings, wherein:

FIGURE 1 is an elevational view of a reel looking at its edge;

FIGURE 2 is a sectional view of the reel of FIGURE 1 taken on a plane coincident to the inner face of one side flange;

FIGURE 3 is a fragmentary view partially in section showing a tape releasably secured to the hub;

FIGURE 4 is an enlarged sectional viewing showing the tape-hub attachment;

FIGURE 5 is a plan view of one end of a tape;

FIGURE 6 is an edge view of the tape portion of FIGURE 5;

FIGURE 9 is an enlarged plan view of a reel spindle with an attached electro-magnet in section;

FIGURE 10 is a fragmentary perspective of a reel design for association with the spindle of FIGURE 9; and FIGURE 11 is a sectional view through the spindle of FIGURE 9 as at line 11—11 of FIGURE 9.

Figure 7:
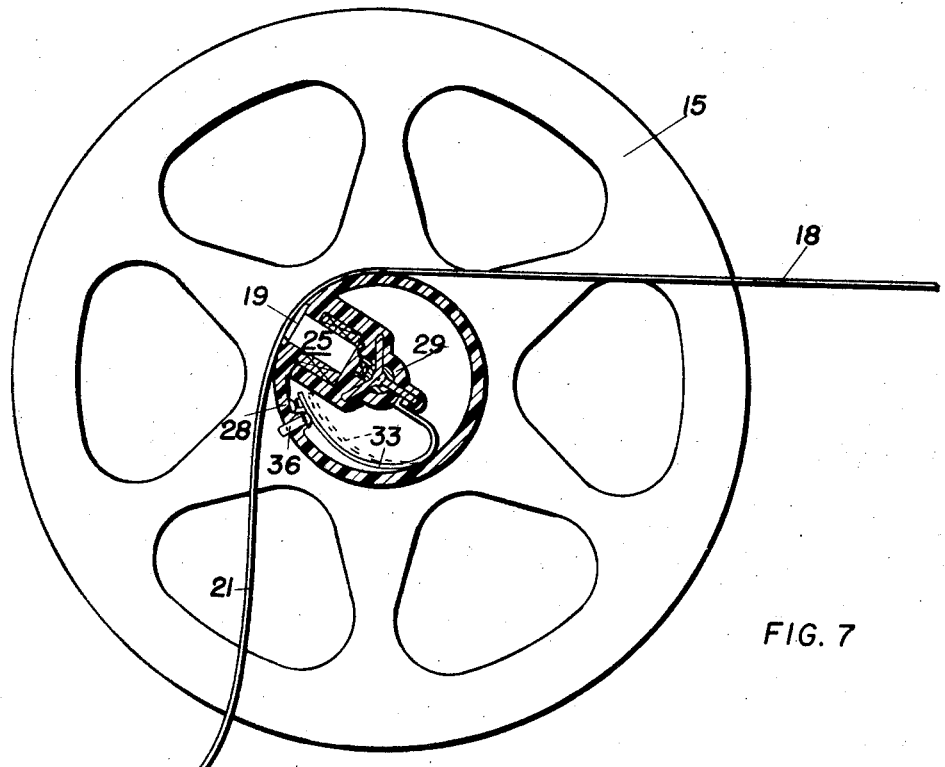
FIGURE 7 is a sectional view similar to FIGURE 2 and showing an electro-magnet in the hub of a modified reel.

Having reference now more particularly to the drawings, the numeral 15 has reference to a reel which may be formed from any non-magnetic material found suitable, such as plastic or aluminum and is comprised of a cylindrical hub 16 defined at its ends by parallel annular flanges 17—17 spaced apart a predetermined amount to accommodate a tape-like member as 18. Obviously, the width and other dimensions of the tape-like member 18 will dictate the spacing and radial extent of the flanges 17—17 and thus the axial dimension of the hub 16.

To facilitate this description and minimize the verbal requirements, the disclosure may be restricted to conventional ¼″ magnetic recording tape and corresponding equipment, but it is to be understood that I do not so limit the invention but desire to cover any and all fields of application to which it is now or later found to be applicable, within the scope of the appended claims.

Fixed to the tape 18 at a point spaced from one free end, a distance at least substantially equal to or greater than the radius of the reel 15, is a rigid magnetic substance 19, for example, iron. Preferably an adhesive 20 is employed to secure the substance 19 but other acceptable means may be employed. The tape 18 from its free end to the substance 19 may be termed the tongue 21.

The hub 16 has fixed thereon, a magnetic substance 22 having its outer face 22′ exposed in the bottom of a recess 23 which is defined at one side cricumferentially of the hub 16 by a shoulder 24 undercut to mate with the angular edge face 19′ of the substance 19.

It is thus far seen that the tape is provided with a hook-type engagement or catch with the hub when the forces between the tape and hub are tangential to the periphery of the hub 16, but when this force is radial of the hub 16, the edge or catch 19′ of the substance 19 will be pulled from the shoulder 24 and thus release the tape.

One or both substances 19 and 22 will be magnetized. Thus the substances 19 and 22 will be urged toward engagement as seen in FIGURES 2–4 of the drawings.

To interconnect the tape 18 with the reel 15, one grasps the tongue 21 with one hand and tape 18 with the other hand and moves the tape between the flanges 17—17 so that the substance 19 comes in contact with the hub 16. Manual rotation of the reel 15 disposes the substances 22 and 19 so that magnetic attraction draws them into position with the edge or catch 19′ engaged with the shoulder 24, as seen in FIGURE 2.

When the tape machine (not shown) is turned "on," the reel rotates in the direction of the arrow of FIGURE 2 and causes the tongue 21 to double back (FIGURES 3 and 4) and thus wind upon the hub 16. When the tape is to be removed, as in rewinding, continuing radial pull will remove the substance 19 from "hooked" engagement with the shoulder 24.

The structure thus far defined is satisfactorily effective when the magnetic flux of the substances 19 and 22 is minimal and it does not adversely affect tapes of speech even when stored for a time. However, under other circumstances, such as in use relative to video tape, computer tapes, high fidelity music, tapes stored over long periods of time and similar conditions and circumstances, it is preferred that even minimal magnetic fluxes foreign to the recorded material be separated from the tapes.

Figure 8:
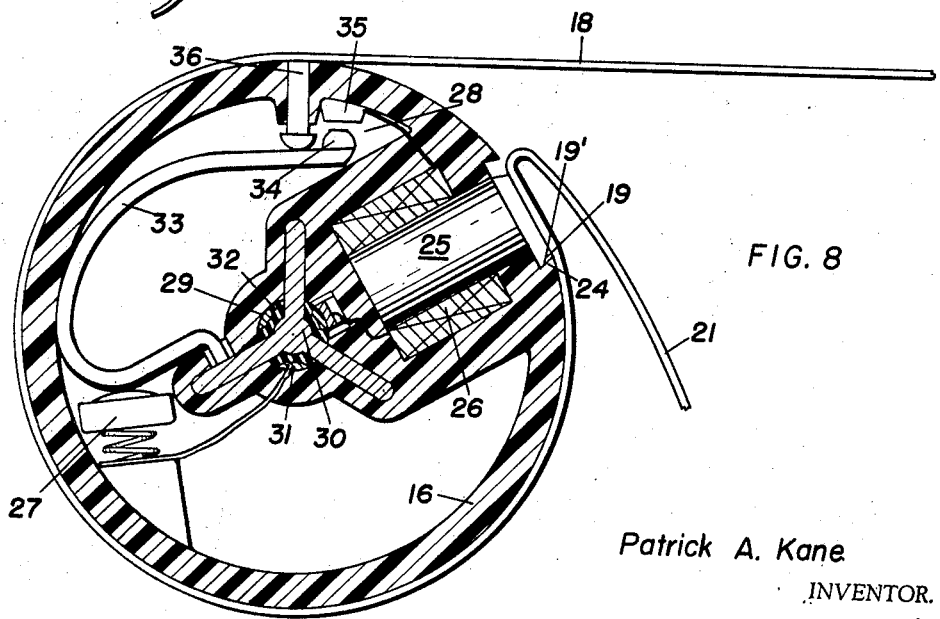
FIGURE 8 is an enlarged view of the hub of the reel shown in FIGURE 7 and on the same plane.

In FIGURES 7 and 8 I have shown a slight modification in that the hub 16 houses an electro-magnet 25 having an energizing coil 26 which is in a circuit including a source of electrical energy, such as battery 27 and a switch 28 for selectively energizing and de-energizing the coil 26 and thus controlling the magnetism of the magnetic substance 25.

If desired, the source of electrical energy may be other than the hub-contained battery 27 and be supplied through the spindle 29 having a tri-radiate center conductor 30 and interdigitating contact strips 31 separated by dielectric material 32.

A spring arm 33 acts as a support for contact 34 and biases it into electrical connection with contact 35. A pin 36 is mounted in the hub 16 for radial reciprocation and is disposed to press against arm 33 and separate the contacts 34 and 35 of switch 28 when depressed.

The pin 36 extends radially beyond the periphery of the hub 16 and is depressed by the first convolute of the winding tape 18 to de-energize the electro-magnet 25 prior to the first full wrap of the tape. There is therefore no danger of affecting the recording.

In FIGURES 9–11 I have shown a further modification wherein the spindle 37 has a rotatable table 38 secured thereto and the electro-magnet 39 is secured thereon. The reel 40 has a cavity 41 formed in the hub to enclose the electromagnet 39 when the reel is mounted upon the spindle.

Electrical energy from a source (not shown) is carried through brushes 42 and 43 to conductors 44 and 45 which pass through the spindle and thence a circuit which includes the coil 39′ of the electro-magnet and a switch 46. The armature 47 is biased outwardly by spring 48 and its flange or head 49 acts as one contact member of the switch which makes and breaks the circuit between contacts 50 and 51 as the armature moves axially. When the tape 18 completes one turn about the hub 40′ it presses the substance 19 against the armature 47 shifting it inwardly and breaking the circuit at switch 49–51.

Having thus described my invention I claim:

1. Means for releasably securing a flexible tape-like member to a cooperating reel having a hub, comprising:
    said reel having a magnetic substance rotatable therewith and disposed relative to the periphery of said hub;
    said member having a magnetic substance affixed thereto spaced from one end thereof a distance great enough to be manually grasped while said last-named substance is disposed on reel hub; and
    at least one said magnetic substance being magnetized in accordance with manual selection.

2. The invention according to claim 1 and further characterized by:
    said magnetic substance affixed to said tape-like member being resistive to deformation and having a thickness perpendicular to the major surfaces of said member;
    the hub of said reel having a shoulder constructed and arranged to engage said last-named magnetic substance and releasably secure said member tangentially to said hub for winding thereon; and
    said shoulder being disposed on said hub relative to its magnetic substance to admit of magnetic attraction between both magnetic substances.

3. The invention according to claim 1 and further characterized by:
    said tape-like member being sufficiently flexible as to be incapable of supporting itself and the said attached substance as in cantilever;
    the last named magnetic substance being carried by said hub; and
    an electro-motive circuit for inducing magnetism to said last named magnetic substance.

4. The invention according to claim 3 and further characterized by:
    said magnetic substance affixed to said tape-like member being resistive to deformation and having a thickness perpendicular to the major surfaces of said member;
    the hub of said reel having a shoulder constructed and arranged to engage said last-named magnetic substance and releasably secure said member tangentially to said hub for winding thereon; and
    said shoulder being disposed on said hub relative to its magnetic substance to admit of magnetic attraction between both magnetic substances.

5. The invention according to claim 4 and further characterized by:
    said electro-motive circuit including a pressure sensitive switch carried by said hub and actuable by winding said tape-like member on said hub to open said circuit and de-magnetize said hub-affixed magnetic substance.

6. The invention according to claim 5 and further characterized by said switch, comprising:
    a pair of contacts; and
    a radially movable element disposed and yieldable to be depressed by winding said tape-like member upon said hub and adapted to open said contacts when so depressed.

7. The invention according to claim 3 and further characterized by:
the last named magnetic substance being adapted for rotation with said hub; and
an electro-motive circuit for inducing magnetism to said last-named magnetic substance.

8. The invention according to claim 7 and further characterized by:
said electro-motive circuit including a pressure sensitive switch actuable by winding said tape-like member on said hub to open said circuit and de-magnetize said last-named magnetic substance.

9. In a device for releasably securing a tape-like member to a reel, the improvement comprising:
a releasable reel-fastening magnetic means fixed to the said member at a selected point spaced from one end of the member a distance great enough to be manually grasped while said fastening means is disposed to be releasably secured at said reel's hub.

References Cited

UNITED STATES PATENTS

| | | | |
|---|---|---|---|
| 1,265,400 | 5/1918 | Sundh | 242—78.3 |
| 1,692,789 | 11/1928 | Young. | |
| 2,695,140 | 11/1954 | Haugaard | 242—57 X |
| 2,954,940 | 10/1960 | Herrmann | 242—57 X |

NATHAN L. MINTZ, *Primary Examiner.*